United States Patent [19]

Adams

[11] 4,014,227
[45] Mar. 29, 1977

[54] WIRE GUIDED ROLL CROWNING ATTACHMENT FOR LATHES

[75] Inventor: Richard J. Adams, Beloit, Wis.
[73] Assignee: Beloit Corporation, Beloit, Wis.
[22] Filed: Mar. 19, 1976
[21] Appl. No.: 668,684
[52] U.S. Cl. .............. 82/1 R; 33/181 R; 51/49; 82/11; 408/13; 51/165.92
[51] Int. Cl.$^2$ ................................. B23B 3/00
[58] Field of Search ........... 82/11, 21 B, 1 R, 1 C, 82/2 B; 90/13.9, 13 C; 51/165.92, 165.71, 165 TP, 49; 33/46 AT, 181, 185; 408/13

[56] References Cited

UNITED STATES PATENTS

| | | | |
|---|---|---|---|
| 3,056,319 | 10/1962 | Thielenhaus | 82/21 A |
| 3,143,041 | 8/1964 | Namenyi-Katz | 82/2 B |
| 3,348,057 | 10/1967 | Burroughs | 33/181 R |
| 3,398,489 | 8/1968 | Rohrer | 51/49 |
| 3,600,987 | 8/1971 | Kvasnicka | 82/1 R |
| 3,635,108 | 1/1972 | Prince | 82/1 R |
| 3,685,375 | 8/1972 | Hill et al. | 82/11 |
| 3,736,818 | 6/1973 | Ennis | 82/1 R |

Primary Examiner—Leonidas Vlachos
Attorney, Agent, or Firm—Dirk J. Veneman; Michael L. Gill; Gerald A. Mathews

[57] ABSTRACT

An apparatus for compensating for deviations in the straightness of the bed of a machine tool including a wire means providing the reference of straightness. In one embodiment, a wire means is tautly mounted along the bed and submerged in oil to help prevent vibration of the wire means to increase the accuracy of the machine tool. A sensor is mounted to the carriage of the lathe and senses the position of the wire in the oil bath and signals a motor means to adjust the position of the machine tool according to deviations in the straightness of the bed.

18 Claims, 9 Drawing Figures

WIRE GUIDED ROLL CROWNING ATTACHMENT FOR LATHES

BACKGROUND OF THE INVENTION

The invention relates to machine tool bed straightness compensating means and, more particularly, it is especially appropriate for use as an apparatus for compensating for deviations in the straightness of the ways of a horizontally extending machine tool, such as a lathe. Still more particularly, its best application is on long machine tools for working large items, such as rolls and beams.

In precision lathes, the straightness of the bed which guides the carriage on which the tool is mounted is very important. Any deviation from straightness in the bed is reproduced in the work pieces. On a roll, for example, such a deviation is increased by a factor of two measured on the diameter. It is one thing to provide accuracy and straightness in a lathe having a bed, say, 20 feet long. It is quite another thing to provide accuracy and straightness in a much larger lathe. It is not uncommon for modern lathes to have beds up to 100 feet in length. Often such beds are made of several sections which are machined, hand scraped, and hand fitted together. It is not possible from a practical standpoint to make beds of this type sufficiently straight for precision work, especially on large rolls which may be 60 inches in diameter and up to 400 inches long.

SUMMARY OF THE INVENTION

The device in accordance with one embodiment of the invention comprises a wire means mounted along the longitudinal axis of the machine tool to serve as a reference line of straightness. The wire means is submerged in a trough filled with oil to stabilize the wire by damping vibration of the wire and to prevent metal chips or other contaminates from interfering with the wire-sensor arrangement. A sensor means mounted on the tool carriage senses the position of the wire and causes the carriage to travel in a straight line, or some predetermined deviation thereof, regardless of the lateral deviations in the straightness of the bed ways.

In another embodiment, a wire is positioned parallel to the longitudinal axis of a moving tool without any oil bath. A proximity transducer is mounted on the lathe carriage to sense any deviation of the carriage from the path defined by the flat wire as the carriage moves along the machine ways. Any vibration of the wire is detected by the transducer whose output signal is averaged over a given period of time to effectively maintain a fixed line of reference for determining deviations on which to base corresponding adjustments of the machine tool.

Thus, regardless of which lateral direction the ways might deviate from a straight line, or how often or to what extent this occurs along their length, the machine tool position will be adjusted accordingly.

In still another embodiment, a sensor rod is mounted on the tool holder. The wire is independently mounted adjacent the tool holder and is coextensive and parallel with the surface of the piece to be worked. The wire and tool are in the same horizontal plane so that vertical deviations in one of the ways is translated into horizontal movement of the tool which is, in turn, compensated by action generated by the wire-sensor rod arrangement.

Accordingly, it is a general object of the invention to provide a highly accurate apparatus for compensating for deviations in the straightness of the bed of a machine tool.

Another object is to provide apparatus especially useful in compensating for the lateral deviation in straightness of the horizontally extending ways on a long bed of a machine tool.

Another object is to provide apparatus for improving the accuracy of working the surface of a large work piece mounted along the ways of a long machine tool bed, despite any deviations in the straightness of the ways.

Still another object is to provide a simple apparatus, for compensating for deviations in the straightness in the lateral guide means of a machine tool, which is capable of being mounted on existing machines to economically improve their accuracy.

These and other objects, features and advantages of the invention will be readily apparent to one skilled in the art as the following description of the preferred embodiments are read in conjunction with the attached drawings.

DESCRIPTION OF THE PREFERRED EMBODIMENT

Figure 1:
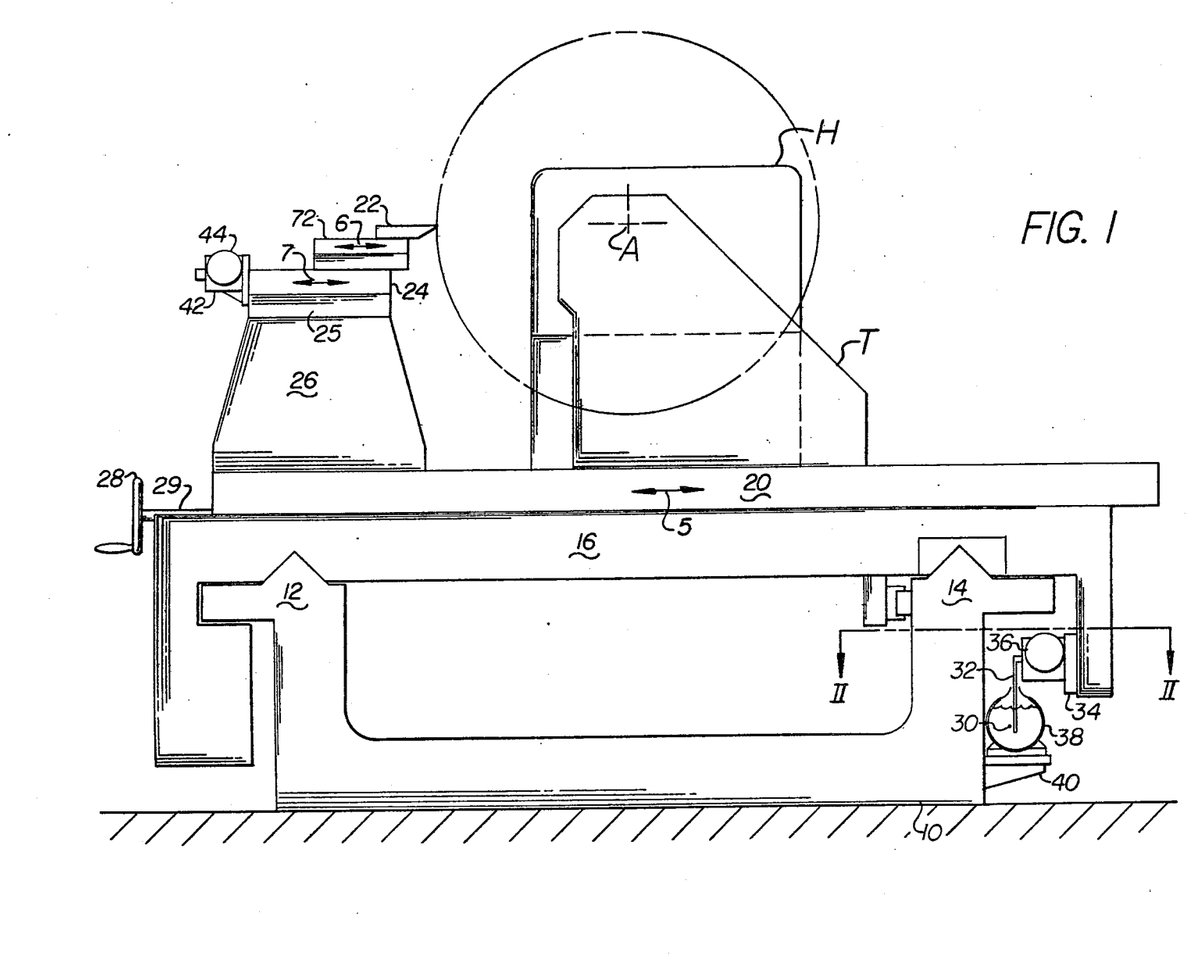
FIG. 1 is a somewhat schematic end elevational view of a lathe with some parts shown in section for clarity.

As shown in FIG. 1, the invention is shown as utilized in a standard lathe, such as is used for the cutting of crowns on paper machine rolls or the machining of straight faced rolls. The bed of such a lathe may be up to about 100 feet long. The bed of the lathe shown comprises a structure generally indicated at 10.

Before preceding further, it is pointed out that corresponding elements in the other embodiments are designated by the 100, 200 and 300 series of numerals to distinguish them.

The bed is supported on the floor in a conventional manner and is provided with a pair of longitudinally extending ways 12 and 14. The roll lathe shown is also provided with the usual head stock and tail stock for supporting a roll R which is shown in phantom. The longitudinal axes of the roll R is indicated at A. The headstock H and tailstock T are shown somewhat schematically and it is understood that the tailstock is mounted on the lathe bed 10 in a conventional manner which is not shown for purposes of clarity in FIG. 1. The carriage of the lathe is indicated generally at 16 and is driven along the bed in a conventional manner.

A cross slide 20 is mounted on the carriage 16 in conventional fashion and carries a cutting tool 22 supported on a tool slide 24 spaced from the cross slide 20 by means of a spacer 26. The cross slide 20 is mounted for transverse movement relative to the bed 10 and the carriage 16 and is provided with the usual cross feed screw 29. As is also conventional, a cross feed screw extends transversely of the bed 10 and is rotated by handle 28 to produce a transverse movement of the cross slide 20. The tool slide 24 is driven by a stepping motor 44 through a worm gear screw jack 42.

The lathe mechanism described thus far is conventional and well understood by those skilled in the art. Therefore, a further detailed description thereof is not necessary.

In accordance with the invention, there is provided apparatus for compensating for deviations in the straightness of the bed. Such apparatus includes means providing a highly accurate reference of straightness in the form of a taut piano wire, or other suitable wire, which is positioned parallel to the longitudinal axis of the machine tool and, of course, parallel to the longitudinal axis of a roll therein.

A detector means, such as sensor rod 32, is carried by the carriage 16 as it moves along the bed 10 to detect any deviation of the carriage from straightness of movement which is caused by bed deviation. Sensor rod 32, which is mounted on the carriage 16 of the lathe 10 by means of a worm gear screw jack 34, is driven by a stepping motor 36 toward and away from wire 30. The sensor rod 32 is initially positioned in very close proximity to the wire 30. It is anticipated that if wire 30 was stretched along the lathe in ambient atmosphere without protection, vibrations might occur and contaminants might interfere with the sensor-wire combination causing problems in control, sensitivity and accuracy. Therefore, wire 30 is submerged in an oil bath 37 in an enclosed trough 38 mounted on support brackets 40.

The tooling slide 24 is mounted for transverse motion with respect to its support 25 by means of a worm gear screw jack 42 driven by a stepping motor 44.

Figure 2:
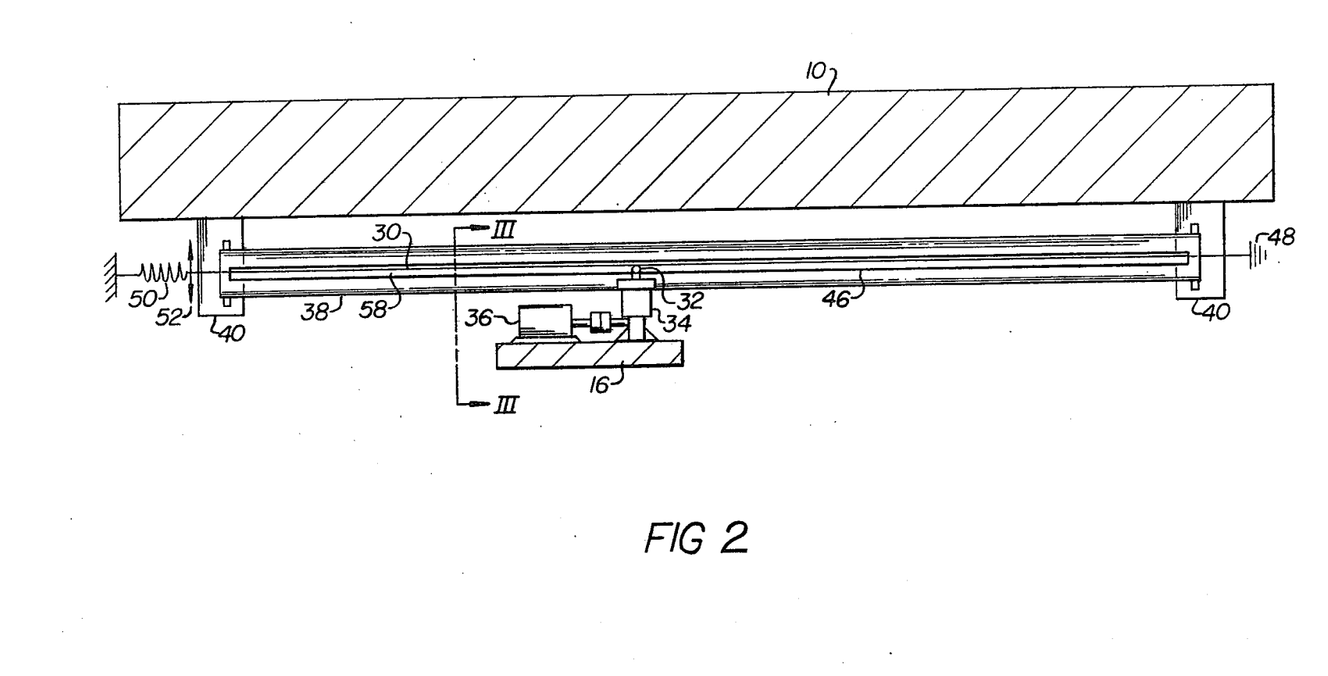
FIG. 2 is a partial plan view taken along the lines II—II of FIG. 1.
Figure 3:
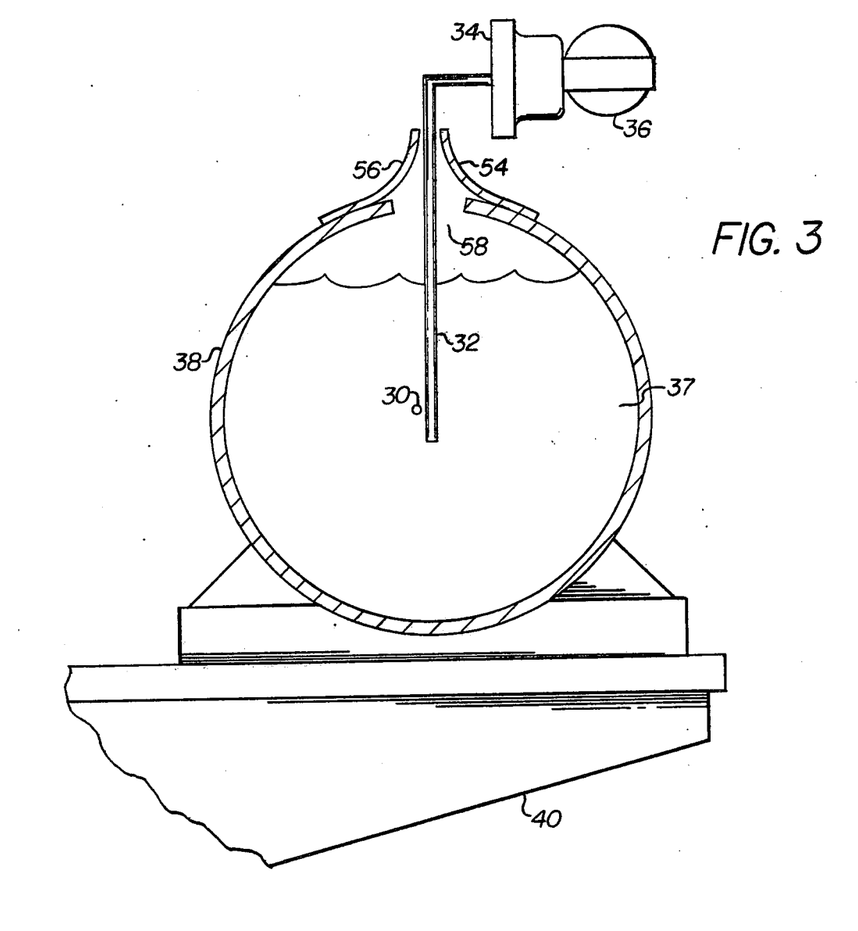
FIG. 3 is an enlarged cross-sectional view taken along the lines III—III of FIG. 2.

FIG. 2 shows the arrangement of the piano wire, stepping motor and worm gear screw jack in more detail. As shown, the piano wire 30 is mounted in an oil bath 37 in a trough 38 which is mounted to the lathe bed 10 by means of brackets 40. The piano wire is held in a fixed position at one end generally indicated by the numeral 48 and is tensioned by means of a spring 50 or other suitable tensioning means at the other end. One end of the wire is arranged to be shiftable in a direction transverse to the longitudinal axes of the lathe for purposes of initial alignment and this mechanism is generally indicated by the double headed arrow 52. FIG. 3 shows the arrangement of the sensor rod and oil bath in more detail. The trough 38 has a longitudinally extending slot 58 therein through which the sensor rod 32 extends into the oil bath 37 and in close proximity to the wire 30. The sensor rod is shown as being attached to the jack 34 driven by a stepping motor 36. In order to prevent metal chips or other contaminants from falling into the oil bath, two seals 54 and 56 are provided on either side of the slot. The seals extend the full length of the slot 58 and may be made of rubber or other suitable flexible material. The seals are arranged such that they will be fully closed along the full length of the slot at all times except in that portion where the sensor rod 32 is located. It is anticipated that other arrangements could be used to protect the oil bath from contaminants. For example, by using a top cover on the trough to form a slot along the top of one side, the rod could be positioned through the slot without requiring any seals.

Figure 4:
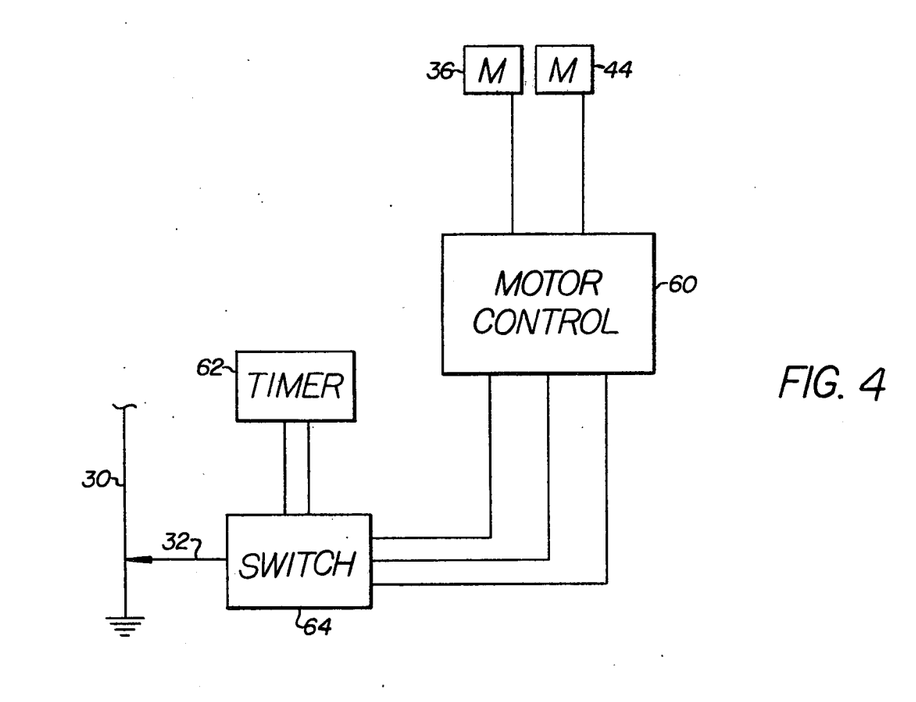
FIG. 4 is a schematic illustration of the control means in accordance with the embodiment of FIG. 1 of the invention.

FIG. 4 shows in schematic representation, the control means utilized to control the apparatus shown in FIGS. 1 – 3. As shown in FIG. 4, items 36 and 44 indicate the stepping motors attached to the sensor rod 32 and to the tool slide 24 respectively. A motor control mechanism for the motors 36 and 44 is indicated at 60, the function and operation of which will be explained in detail hereinafter. The sensor rod 32 mounted in close proximity to the wire 30 is shown as being connected to a flip-flop switch 64 which switch in turn is connected to a timer 62. The motor control 60 is essentially an adjustable speed drive control which includes a built-in oscillator to supply the triggering signals to the stepping motors 36 and 44. The oscillator frequency can be adjusted to vary the speed of the stepping motors from, for example, one step per second up to the maximum permissible with the particular stepping motor used.

In operation, the motor control 60 will be set to rotate the stepping motors 36 and 44 in a predetermined direction (clockwise) and at a predetermined speed, for example, 4 steps per second. The sensor rod 32 is positioned in very close proximity to the wire 30 and the rotation of the stepping motor 36 is such that the sensor rod 32 is caused to move toward the wire 32. Simultaneously, the stepping motor 44 rotates in a direction such that the tool 22 moves away from the roll R. When the sensor rod 32 contacts the wire 30, which is grounded, a change in electrical potential will be effected which activates the flip-flop switch 64. The switch 64 will send a signal to the motor control 60 which will reverse the direction of rotation of the stepping motors 36 and 44. Simultaneously the switch 64 will activate the timer 62 and cause it to run for a predetermined time, for example, two seconds. During the time period set by the timer 62, the stepping motors 36 and 44 will rotate in the opposite direction thus causing the sensing rod 32 to move away from wire 30, and the tool 22 to move toward the roll R, respectively. After the predetermined two seconds, the timer 62 will again actuate the flip-flop switch 64 causing the motors 36 and 44 to reverse once more to move sensing rod 32 toward wire 30 and tool 22 to move away from roll R. The cycle is thus repeated every four seconds in this example.

Thus, it is seen that in the portion of the cycle where rod 32 is approaching wire 30 and tool 22 is being stepped away from the work surface, if there is a lateral deviation in the ways/bed toward the wire, this deviation will be lessened by an amount equal to the distance the tool is stepped away from the work surface during this period. Furthermore, the rod will be moved away from the wire by a distance equal to this lateral deviation since it is attached to the same carriage as the tool which are both carried on the ways/bed. Therefore, the rod will not contact the wire so soon to interrupt the movement of the tool away from the work piece during this deviation, thus compensating for this deviation. On the other hand, if the lateral deviation of the bed/ways during the same portion of the cycle is away from the wire, the rod will be thereby forced into contact with the wire sooner than would ordinarily occur due to the stepping action of motor 36 and worm screw jack. This will halt the movement of the tool away from the working surface and thus compensate for this bed/ways deviation.

The reasoning regarding the other portion of the cycle wherein the rod 32 is moving away from the wire is analogous.

Thus, by positioning the rod in proximity with the wire and moving it relative thereto in the above described manner, the tool is controlled to lessen, and compensate for, any lateral deviation in the bed/ways. Due to its cyclically inward and outward movement as it travels the length of the work piece, the tool traces a very low amplitude sine wave curve on the face of the work piece. The amplitude is within the limits of the dimensional tolerances desired and controlled by the location and distance of travel of the rod relative to the wire. Furthermore, lateral deviations in the ways are compensated. The net effect is an effectively straight surface on a long and/or wide diameter work piece within prescribed tolerances despite lateral deviations in the machine bed/ways.

It will be apparent that any additional movement imparted to the tool holder 72, such as intentionally increasing the radially outwardly movement of the tool from the axis of rotation of a roll to produce a crown thereon, will be superimposed on the compensatory movement of the apparatus so that the surface defined by such additional movement will also be true within the prescribed tolerances.

It should be noted that in order to avoid wear, the timer 62 can be adjusted such that following contact by the sensor rod with the wire there will be a predetermined waiting period, for example, 15 seconds before the flip-flop switch will again be activated to reverse the movement of the sensor rod. During this 15 second period, the rod will remain in contact with the wire. Alternatively, the waiting period can be commenced when the rod is away from the wire so that the rod will be out of contact with the wire for the 15 second period.

The present invention is capable of extreme accuracy, especially in the context of machining large diameter rolls in a lathe, as will be appreciated by the following example.

A stepping motor in which each revolution is divided into 200 steps is used in conjunction with a worm gear screw jack, such as made by Duff Norton, in which one revolution represents an advancement of 0.001 inches. With the oscillator frequency of the motor control set at 10 pulses per second, and the timer set for 2 seconds, the advance or retraction of the tool per cycle would be:

duce a roll with a diameter accurate to about 0.004 inch.

It should be noted that this accuracy is facilitated by submerging the wire in the oil bath which assures stability of the wire. This is an important feature of embodiment of the invention.

It should also be pointed out that in the preferred embodiments of the invention the speed of the stepping motors is set at a relatively low value, preferably about 10 steps per second, to avoid any build up of momentum which could result in undesirable inaccuracies.

Figure 5:
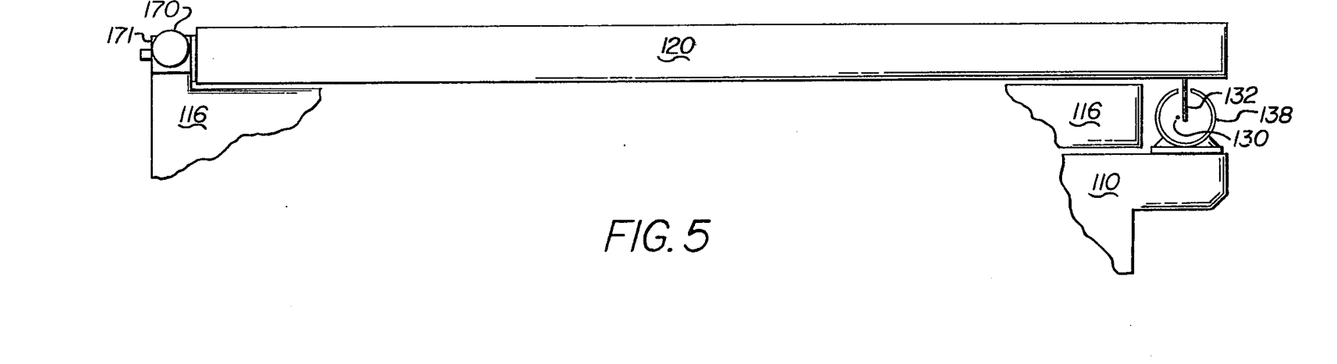
FIG. 5 is a partial view of another embodiment showing the carriage and cross slide wherein the sensor rod is mounted on the cross slide and the stepping motor is mounted on the carriage thereby eliminating the need for one stepping motor.

In another embodiment of the present invention, stepping motor 36 and its corresponding worm screw jack 34, sensor rod 32 and trough 38 have been eliminated and a sensor rod 132 has been mounted directly on the cross slide 120. This modification is shown in FIG. 5 in conjunction with trough 138. Only one stepping motor 170 and worm gear screw jack assembly 171 are now mounted between the carriage 116 and the cross slide 120. This eliminates the need for a pair of stepping motors 36, 44 and worm gear screw jacks 34, 42, as used in the embodiment shown in FIG. 1, since the tool and cross slide will move together under power of stepping motor 170. This embodiment is particularly useful for smaller lathes where the cross slide 120 is not very massive. On larger lathes, this modification may require a large stepping motor and jack assembly to move the cross slide 120 which may be more expensive than the use of two smaller motors, one of which will move the tooling slide which is substantially lighter than the cross slide 120.

Figure 6:
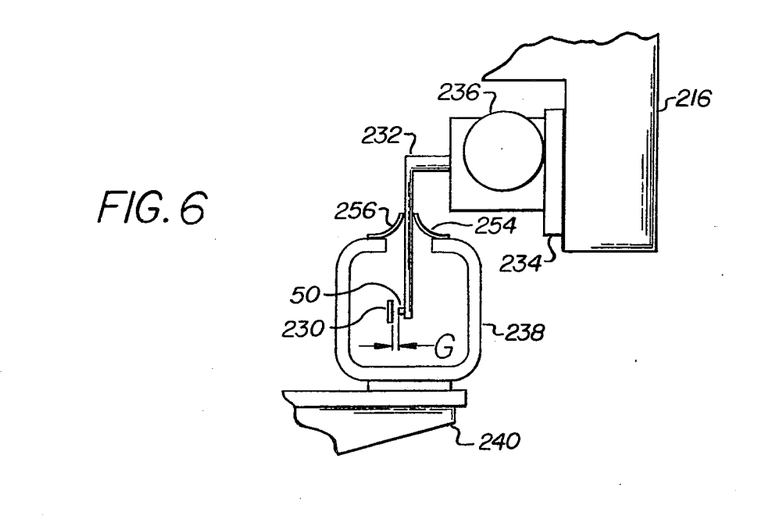
FIG. 6 is a cross sectional view, similar to FIG. 3, but of another embodiment of the deviation determining apparatus utilizing a wire and proximity transducer in a conduit.
Figure 7:
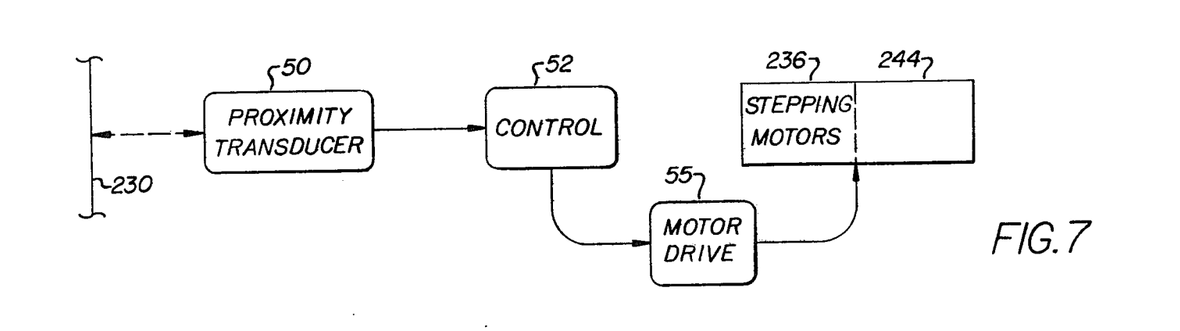
FIG. 7 is a schematic illustration of the control means for operating the tool stepping motor in the embodiment shown in FIG. 6.

In the embodiment shown in FIGS. 6 and 7, a proximity transducer 50 is mounted on the end of a rod 232 which extends into a conduit 238 through a pair of longitudinally coextending flexible seals 254, 256. Rod 232 is attached to lathe carriage 216 by means of a stepping motor 236 and worm gear screw jack 234. Transducer 50 is positioned from a wire 230, which may be flat as shown to provide additional lateral stability, at a desired distance G. The signals emitted from the transducer 50 vary according to its proximity to the wire 230. These signals are received by a control 52 which in turn time averages and digitizes the signal, compares it to a reference and supplies a corresponding signal to the motor drive 55 which directs the stepping motors 236 and 244 to move a specified number of steps in one direction or another to position the tool accordingly in the same manner as described in conjunction with the embodiment shown in FIG. 1. This embodiment does not require a timer. Also, this transducer arrangement could be used in the embodiment shown in FIGS. 5 or 8 in which case one less stepping motor would be required.

Figure 8:
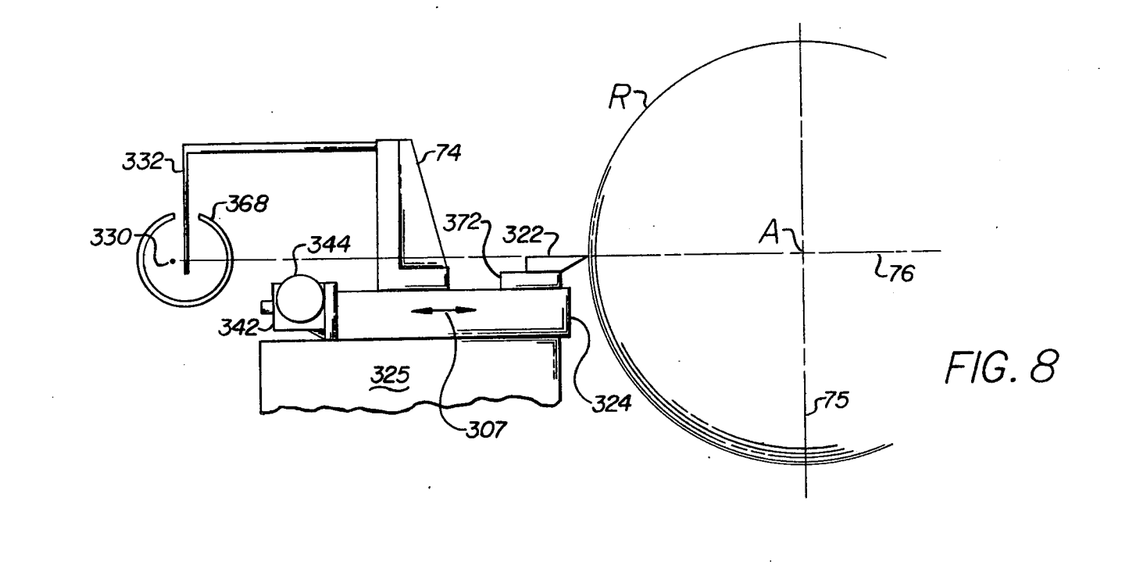
FIG. 8 is an end view of another embodiment wherein the wire and tool are mounted in the same horizontal plane.

Proximity transducer displacement measuring systems, such as a Bently Nevada 3000 Series, commonly provide sensitivities of a 20 mv/mil. A common millivoltmeter can read 1/20 of a thousandth, or 0.00005 inch, with a frequency response of 10 – 20 KHz. Thus, the above described system can easily provide the desired accuracy.

$$.001 \frac{\text{inch}}{\text{rev.}} \times \frac{1}{200} \frac{\text{steps}}{\text{rev}} \text{(pulse)} \times 2 \text{ sec.} \times 10 \frac{\text{pulses}}{\text{sec}} = .0001 \frac{\text{inch}}{\text{cycle}}$$

which is equal to an accuracy of 2 × 0.0001 = 0.0002 inch on the diameter of the roll. This is very good for a large lathe which could otherwise be expected to pro- This transducer embodiment does not require the use of two stepping motors and worm gear jack screws when used in the embodiments shown in FIGS. 5 or 8.

Furthermore, in any embodiment, vibrations in wire 230 can be averaged out behind the transducer by suitable electrical means so that the signals from control 52 to the stepping motors 236 and 244 will be based on the center position of the wire regardless of any such vibration.

Wire 230 can be common shim stock since its surface finish is well within the desired accuracy of the example given above. In addition, since vibrations in the wire can be averaged out, and since the wire could be shielded by a local shield attached to, and movable with, the rod over the transducer, no oil bath or trough is mandatory in this embodiment.

Figure 8A:
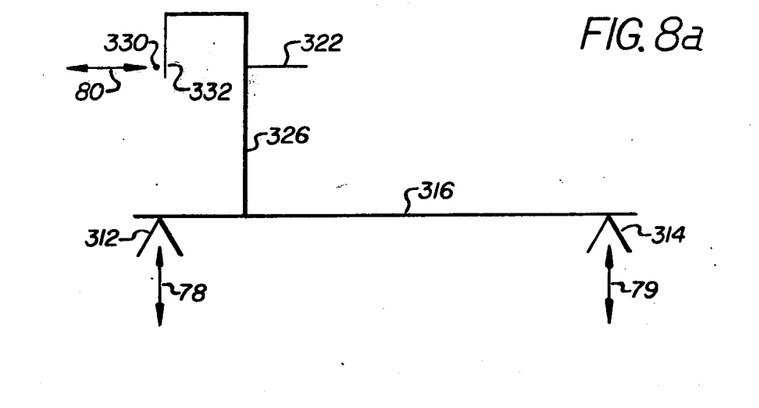
FIG. 8a is a schematic diagram illustrating how vertical deviation in one of the ways can be compensated by the embodiment shown in FIG. 8.

FIGS. 8 and 8a illustrate another embodiment wherein the sensor rod 332 is mounted to a rod holder 74 which in turn is attached to tool slide 324 which is movable back and forth at right angles to the work piece in the direction of double headed arrow 307. In operation, stepping motor 344 moves tool slide 324, and rod 332 toward wire 330 by turning worm gear screw jack 342 mounted between slide 324 and support 325. Except for the fact that only one stepping motor screw jack combination is required, the operation and controls are the same as described in conjunction with the embodiment shown in FIGS. 1-3.

However, this embodiment has several distinctive features and advantages. The wire 330, tip of tool 322 and center of rotation of roll R about axes 75, 76 are all in the same horizontal plane. Thus, with reference to FIG. 8a, vertical movement of one of ways 312, 314 in the direction of arrows 78, 79 will be translated, at least partially, into horizontal movement of the tool in the direction of double headed arrow 80. Therefore, horizontal errors caused by such vertical deviation can also be at least partially compensated by this arrangement.

It should be particularly pointed out that in all embodiments, the rod is positioned to the right of the wire and initially moves toward it so that the tool is moving away from the roll surface. Thus, if the wire breaks, the tool is moving away from the roll surface where such a mishap will result in no harm.

While the invention has been primarily described in connection with a lathe, it will be appreciated that the principles above set forth apply equally to other metal working tools such as grinders, boring bars and others. The invention can further be utilized on any of the above metal working tools using, instead of the single point tool described above, such tools as belt sanding heads, wheel grinding heads, polishing heads, roll grooving attachments, roll crowning attachments and others.

It will be apparent that various changes may be made in the construction and arrangement of parts without departing from the scope of the invention. For example, trough 38 could be located on the front of the machine. The transducer arrangement could be substituted for the wire-rod arrangement in any embodiment.

Accordingly, it is not desired to be limited except as required by the following claims.

What is claimed is:

1. Apparatus for compensating for lateral deviations in the straightness of a longitudinally extending bed of a machine tool, which includes a carriage mounted on the bed for travel axially therealong and a toolholding tool slide for movement perpendicular to the direction of the carriage travel, comprising, in combination:
    a wire means mounted to coextend parallel to the direction of travel of the carriage on the bed;
    motor means mounted to effect relative movement between the tool and carriage;
    sensor means mounted on the machine tool and arranged in horizontally spaced adjacency relative to the wire means;
    control means for reciprocating the sensor means and tool, including means for signaling the motor means to (a) initially move the sensor means toward the wire means at a predetermined rate and, (b) to move the tool away from the center of the bed at a corresponding equal rate until the sensor means is activated by its proximity to the wire means whereupon the control means reverses the motor means to move the sensor means and the tool toward center of the bed at a predetermined rate to complete a cycle whereby the tool movement has been compensated for any lateral deviations in the straightness of the bed.

2. Apparatus as set forth in claim 1, wherein:
    the wire means is adjustable in a horizontal plane transverse to the longitudinal extent of the bed.

3. Apparatus as set forth in claim 1, wherein:
    the sensor means comprises a rod which signals the control means upon contact with the wire means.

4. Apparatus as set forth in claim 1, wherein:
    the sensor means comprises a proximity transducer which signals the control means according to its position and movement relative to the wire means.

5. Apparatus as set forth in claim 1, further including:
    a trough means forming a protective conduit about the wire means and into which the sensor means extends.

6. Apparatus as set forth in claim 1, further including:
    liquid within the trough means for damping vibrations induced in the wire means.

7. Apparatus as set forth in claim 1, wherein:
    the control means includes a drive control, a switch and a timer for signaling the motor means to (a) initially move the sensor means toward the wire means at a predetermined rate and (b) to move the tool away from the center of the bed at a corresponding equal cycle and period until the sensor means is activated by its proximity to the wire means whereupon the switch is activated to reverse the motor means and the timer is activated to control operation of the motor means during the second half of the cycle.

8. Apparatus as set forth in claim 7, further including:
    a cross slide, and wherein said motor means comprises a single stepping motor and screw jack mounted between the cross slide and carriage.

9. Apparatus as set forth in claim 1, wherein:
    the motor means comprises a first motor and screw jack mounted on the carriage and a second motor and jack screw mounted intermediate the tool slide and the carriage wherein the first motor driven screw jack reciprocates the sensor means relative to the wire means and the second motor driven screw jack reciprocates the tool in the same corresponding cycle and period as the sensor means.

10. Apparatus as set forth in claim 9, wherein:
    the first and second motors comprise stepping motors which index the sensing means and tool, respectively, a predetermined distance per step at a predetermined frequency.

11. Apparatus for compensating for lateral deviations in the straightness of a longitudinally extending bed of a machine tool, which includes a carriage mounted on the bed for travel axially therealong and a toolholding tool slide for movement perpendicular to the directing of a carriage travel, comprising, in combination:
- a wire means mounted to coextend parallel to the direction of travel of the carriage on the bed;
- first and second stepping motor means including corresponding first and second screw jacks mounted to effect relative movement between the tool and carriage;
- sensor means mounted on the machine tool and arranged in horizontally spaced adjacency relative to the wire means;
- control means for reciprocating the sensor means and tool, including a drive control, a switch and a timer for signalling the first motor means to initially move the sensor means toward the wire means at a predetermined rate and to signal the second motor means to move the tool away from the center of the bed at a corresponding equal rate until the sensor means is activated by its proximity to the wire means whereupon the switch and drive control are activated to reverse both the motor means and the timer is activated to control the operation of both motor means during the second half of the cycle.

12. Apparatus for compensating for the deviations in the straightness in a longitudinally extending bed of a machine tool, which includes a carriage mounted on the bed for travel axially therealong and a toolholding tool slide for movement perpendicular to the direction of carriage travel, comprising, in combination:
- a wire means mounted to coextend parallel to the direction of travel of the carriage on the bed and positioned substantially in the same horizontal plane as the tool;
- motor means mounted to effect relative movement between the tool and carriage;
- sensor means mounted to the machine tool and arranged in horizontally spaced adjacency relative to the wire means;
- control means for reciprocating the sensor means and tool, including means for signalling the motor means to (a) initially move the sensor means toward the wire means at a predetermined rate and, (b) to move the tool away from the center of the bed at a corresponding equal rate until the sensor means is activated by its proximity to the wire means whereupon the control means reverses the motor means to reverse the movement of the sensor means and move the tool toward the center of the bed at a predetermined rate to complete a cycle whereby the tool movement has been compensated for any deviations in the straightness of the bed.

13. Apparatus as set forth in claim 12, wherein:
the motor means comprises a stepping motor unit which indexes the sensing means and tool a predetermined distance per step at a predetermined frequency.

14. Apparatus as set forth in claim 12, wherein:
the motor means comprises a stepping motor and a screw jack.

15. Apparatus as set forth in claim 12, wherein:
the sensor means comprises a rod which signals the control means upon contact with the wire means.

16. Apparatus as set forth in claim 15, wherein:
the control means includes a drive control, a switch and a timer for signalling the stepping motor to turn the jack screw to (a) initially advance the sensor rod toward the wire means at a predetermined rate and, (b) to move the tool away from the center of the bed at a corresponding equal rate until the sensor rod contracts the wire means whereupon the switch is activated to reverse the drive control and the direction of the stepping motor and the timer is activated to control the operation during the second half of the cycle.

17. Apparatus as set forth in claim 14, wherein:
the sensor means comprises a proximity transducer;
the control means includes (a) a control for receiving signals from the proximity transducer and to time average, digitize and compare the signals to a predetermined reference and, (b) a motor drive to move the stepping motor a number of steps in a given direction based on the signals received from the control.

18. Apparatus for compensating for lateral deviations in the straightness of a longitudinally extending bed of a machine tool, which includes a carriage mounted on the bed for travel axially therealong and a toolholding tool slide for movement perpendicular to the direction of the carriage travel, comprising, in combination:
- a wire means mounted to coextend parallel to the direction of travel of the carriage on the bed;
- stepping motor means mounted to effect relative movement between the tool and carriage;
- sensor means comprising a proximity transducer which signals the control means according to its position and movement relative to the wire means;
- control means for reciprocating the sensor means and tool including (a) a control for receiving signals from the proximity transducer and to time average, digitize and compare the signals to a predetermined reference and, (b) a motor drive to move the stepping motor means a number of steps in a given direction based on the signals received from the control.

* * * * *